United States Patent
Sahlgren et al.

(10) Patent No.: US 7,697,801 B2
(45) Date of Patent: Apr. 13, 2010

(54) WAVELENGTH SELECTIVE SWITCH

(75) Inventors: Bengt Sahlgren, Saltsjö-Boo (SE); Ulf Öhlander, Hässelby (SE)

(73) Assignee: Proximion Fiber Systems, AB, Kista (SE)

( * ) Notice: Subject to any disclaimer, the term of this patent is extended or adjusted under 35 U.S.C. 154(b) by 906 days.

(21) Appl. No.: 10/520,478

(22) PCT Filed: Jul. 10, 2003

(86) PCT No.: PCT/SE03/01202

§ 371 (c)(1),
(2), (4) Date: Oct. 3, 2005

(87) PCT Pub. No.: WO2004/008208

PCT Pub. Date: Jan. 22, 2004

(65) Prior Publication Data

US 2006/0165346 A1    Jul. 27, 2006

(30) Foreign Application Priority Data

Jul. 10, 2002   (SE) .................................. 0202160

(51) Int. Cl.
*G02B 6/26*   (2006.01)
(52) U.S. Cl. ...................... 385/16; 385/123
(58) Field of Classification Search ............... 385/1.19, 385/20, 27, 31, 48, 49, 123
See application file for complete search history.

(56) References Cited

U.S. PATENT DOCUMENTS

| | | | | |
|---|---|---|---|---|
| 5,307,437 A * | 4/1994 | Facq et al. | ................... | 385/124 |
| 5,740,292 A * | 4/1998 | Strasser | ....................... | 385/37 |
| 6,101,300 A * | 8/2000 | Fan et al. | ...................... | 385/27 |
| 6,212,310 B1 * | 4/2001 | Waarts et al. | .................. | 385/24 |
| 6,304,696 B1 * | 10/2001 | Patterson et al. | .............. | 385/37 |
| 6,501,879 B1 * | 12/2002 | Asseh et al. | .................. | 385/37 |
| 6,640,024 B1 * | 10/2003 | Kim et al. | ..................... | 385/24 |
| 6,826,343 B2 * | 11/2004 | Davis et al. | .................. | 385/126 |
| 7,139,485 B2 * | 11/2006 | Asseh et al. | .................. | 398/84 |
| 7,295,732 B2 * | 11/2007 | Henriksson et al. | ........... | 385/50 |
| 2004/0131312 A1 * | 7/2004 | Ohlander et al. | .............. | 385/37 |

FOREIGN PATENT DOCUMENTS

EP    0 506 546 A2    9/1992

(Continued)

*Primary Examiner*—Frank G Font
*Assistant Examiner*—Peter Radkowski
(74) *Attorney, Agent, or Firm*—Birch, Stewart, Kolasch & Birch, LLP

(57) ABSTRACT

A spectrally selective optical switch is disclosed. The switch comprises a first and a second optical waveguide each having a light guiding structure arranged to guide light along a predetermined path, the optical waveguides being arranged adjacent and parallel to each other; an external resonator defined by a first and a second mirror, said first and said second mirror being provided on opposite sides and outside of said first and second light guiding structures, and said external resonator being resonant to a specific wavelength; and a deflector provided in each of said first and second optical waveguide, the deflectors being arranged to deflect light propagating in one of the light guiding structures to the other light guiding structure by operation of said external resonator. A matrix switch is also disclosed.

8 Claims, 6 Drawing Sheets

P1: Waveguide
P2: First reflector
P3: Deflector
P4: First actuator
P5: Second reflector
P6: Second actuator

FOREIGN PATENT DOCUMENTS

| WO | WO-98/05133 A1 | 2/1998 |
| WO | WO-00/17679 A1 | 3/2000 |
| WO | WO-02/06878 A1 | 1/2002 |
| WO | WO 02/052762 * | 7/2002 |
| WO | WO-02/103447 A1 | 12/2002 |

* cited by examiner

P1: Waveguide
P2: First reflector
P3: Deflector
P4: First actuator
P5: Second reflector
P6: Second actuator Eight-fibre switch devices using two-fibre switch devices Four-fibre switch devices using two-fibre switch devices

WAVELENGTH SELECTIVE SWITCH

TECHNICAL FIELD OF THE INVENTION

The present invention relates to a wavelength selective optical switch. More particularly, the present invention relates to methods and devices for coupling individual channels within a wavelength division multiplexed optical signal from one optical fiber to another optical fiber.

TECHNICAL BACKGROUND AND RELATED ART

In order to increase the transmission capacity of optical fiber networks and communication links, wavelength division multiplexing (WDM) techniques are often utilized. In WDM systems, a plurality of wavelength channels is transmitted through a single optical fiber. Fibers are connected at points known as "nodes", at which channels are rerouted towards their final destinations via the best possible fiber paths. Channels may also be added or dropped at so called add/drop points. Generally, at the nodes the WDM-signal is demultiplexed, the individual signals re-routed and sent down the chosen fiber, possibly multiplexed into another WDM signal. At add/drop points, spectrally selective optical switches, also known as channel drop filters, are utilized for extraction of a single wavelength channel from a WDM signal, or for insertion of a single wavelength channel into a WDM signal.

The network may be designed to be either static or re-configurable. A re-configurable network is essential to provide provision of wavelengths and enable protection switching. In a re-configurable network, the nodes and/or add/drop points are equipped with switches or dynamic wavelength converters, giving it the capability to change the routing pattern.

A technology used to enable optical rerouting are MEMS switches, which utilizes small moveable mirrors displaceable to dispatch the optical signal to the chosen fiber. Such an optical switch is presented in U.S. Pat. No. 6,292,281, in which a matrix of mirrors are provided on a silicon wafer based structure. Also, the nodes may be provided with add-drop filters designed to add or drop a specific chosen channel to or from the WDM channel.

However, the prior art technology suffers from several drawbacks. Optical MEMS switches are complicated and difficult to manufacture, and are devices that require de-multiplexing and multiplexing of the WDM signal.

Therefore, there is a need for devices and methods for coupling individual channels within a WDM signal from one fiber to another enabling an easily re-configurable and dynamic network.

SUMMARY OF THE INVENTION

The present invention provides an optical wavelength selective switch, which eliminates, or at least alleviates, the aforementioned problems in the prior art.

A general object of the present invention is to provide an optical device for coupling one or more individual signals propagating in one fiber to another fiber. This general object is achieved by a device, arrangement and method according to the appended claims.

According to a first aspect the invention, a device is provided, comprising a first and a second optical waveguide, each having a light guiding structure arranged to guide light along a predetermined path, the optical waveguides being arranged adjacent and parallel to each other. Furthermore the device comprises an external resonator defined by a first and a second mirror, said first and said second mirror being provided on opposite sides and outside of said first and second light guiding structures, and said external resonator being resonant to a specific wavelength. Finally there is in each waveguide provided a deflector, which is arranged to deflect light propagating in one of the light guiding structures to the other light guiding structure by operation of said external resonator.

According to another aspect of the invention, the device comprises means for adjusting resonator wavelength and phase of the chosen channel to affect.

In yet another aspect, the present invention can serve as an add/drop filter. Individual WDM channels may conveniently be added or dropped by a respective channel manipulation element. Yet another field of use for the optical device according to the present invention is in connection with fiber-to-fiber routers, where the present invention can provide channel exchange between two transmission fibers or fiber rings.

Moreover, the present invention provides other features and advantages that will become apparent when the following detailed description of some preferred embodiments is read and understood.

BRIEF DESCRIPTION OF THE DRAWINGS

In the following, a number of preferred embodiments of the present invention will be described in detail. The description below is more easily understood when read in conjunction with the drawings, in which FIG. 1 schematically shows a first embodiment of a basic optical switch element according to the present invention;

FIGS. 8-12 3 schematically shows embodiments of various switch arrangements.

DETAILED DESCRIPTION OF PREFERRED EMBODIMENTS

Figure 1:
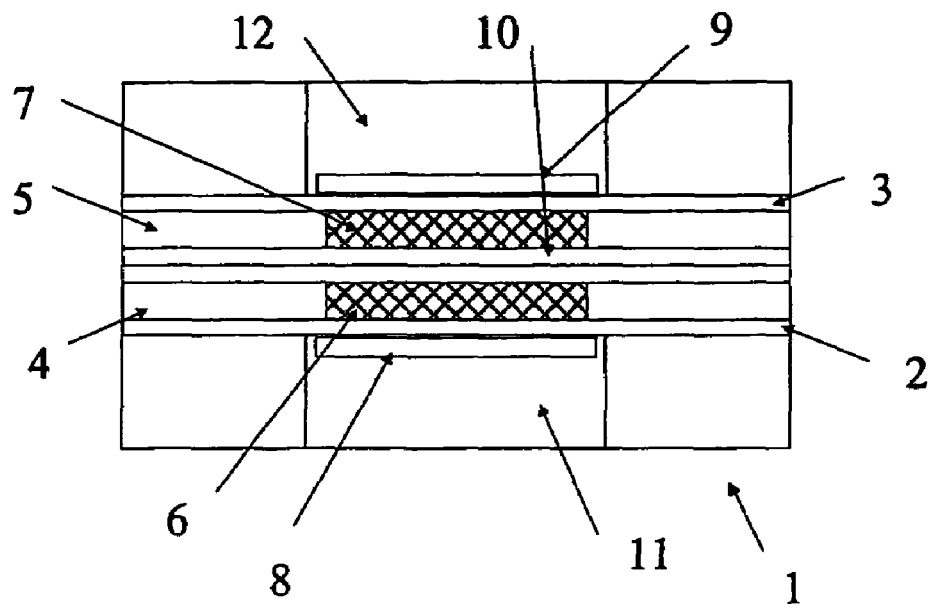

A first preferred embodiment of an optical switch element 1 according to the present invention is schematically shown in FIG. 1. The arrangement shown is to be regarded as the best mode of carrying out the invention. The switch element is used to switch an optical signal from one optical fiber to another optical fiber. This element fundamentally is simultaneously wavelength selective, wavelength tunable and array cascadable.

The switch element 1 comprises a first optical fiber or waveguide 2 and a second optical fiber or waveguide 3, each having a fiber core denoted 4 and 5, respectively. The function of the optical fibers could also be implemented using other sorts of waveguides in glass material or semiconductor material. Considering optical fibers, there could be used two separate fibers as depicted in FIG. 1 or a single fiber with a dual core could be used. The cores 4, 5 are provided with a first deflector 6 and a second deflector 7, respectively. Each deflector 6 and 7 comprises two superimposed blazed fiber Bragg gratings oriented at right angles with respect to each other. The deflectors 6, 7 deflect light impinging upon the two superimposed fiber Bragg gratings into two anti-parallel beams. The deflector element could also be implemented using other sorts of deflectors, e.g. simple blazed fiber Bragg gratings, angled concentrated mirrors, such as metallic mirrors dielectric step mirrors, or angled Bragg reflectors, such as angled dielectric stack mirrors or blazed-grated waveguides. The switch element shown in the figure further comprises two external mirrors 8 and 9, forming an external Fabry-Perot type resonator 10. The external resonator is positioned so that the deflectors 6, 7 are enclosed within the resonator. The external Fabry-Perot resonator may also be implemented using concentrated mirrors, such as metallic mirrors or dielectric step mirrors, or Bragg reflectors, such as dielectric stack mirrors or grated wave-guides. Finally the switch element includes actuators 11, 12 operative to change the optical length of the external resonator (the optical distance between the mirrors) to provide wavelength and phase tuning of the switch element. The optical distance comprises the distance between the first external mirror and the first deflector, distance between the first deflector and the second deflector and the distance between the second deflector and the second external mirror. Each of the distances may be arranged to be individually tunable. The actuators 11, 12 could be implemented using various sorts of actuation methods for changing the optical path length: Actuation by changing the geometrical path length, such as piezo or electrostatic actuation, or actuation by changing the refractive index, such as current injection or reverse-bias actuation in the p-n junction of a semiconductor.

The external resonator provides a spectrally selective enhancement of light energy in the region intended for switching. This is in order to select the particular channel of interest for switching. This is while leaving other channels substantially unaffected. The external resonator forms a Fabry-Perot cavity in which the selected light wavelength experience spectral resonance. The spectral resonance is due to constructive interference by multiple reflections between the first and a second external mirror. The optical path distance between the external mirrors is in the following called the cavity optical length. The cavity optical length multiplied by a factor of two equals a multiple integer number of wavelengths, for the selected channel. Thus, the amount of switched light energy for the channel external resonator depends on the matching of the wavelength to the Fabry-Perot resonance and on the values of reflectance of the external mirrors. Thus, the external mirror provides spectral selection. This is in the following denoted the wavelength tuning mechanism. The wavelength tuning mechanism is a sub product of the Fabry-Perot mechanism.

The deflectors 6, 7 provides the coupling of light energy from the first optical fiber 2 to the second optical fiber 3, which is enhanced for the chosen channel by the wavelength tuning mechanism of the external resonator. Here, the switching is obtained as follows. First, light in the first optical fiber 2 is deflected by the deflector 6 into the external resonator 10. Second, resonance of the selected wavelength is achieved due to the Fabry-Perot resonator. Third, a second deflection of the chosen channel from said external resonator by the second deflector 7 into the second optical fiber.

Another underlying mechanism, in the following denoted the phase tuning mechanism, is provided by the innovative use of superimposed blazed gratings. This provides a means to obtain the phase tuning mechanism in addition to the wavelength tuning mechanism.

The phase tuning mechanism provides a means of turning the switch element from a "bar" to "cross" state. This without the need employ the wavelength tuning mechanism to detune (change) the resonant wavelength. Thus, in a cross-state of the switch element the selected wavelength is coupled from the first to the second optical fiber. In the bar state, the selected wavelength is not coupled to the second fiber, but continues to propagate in the first fiber. The switch element can also be tuned, by the phase tuning mechanism, to a 'broadcast' state, being an intermediate state between the bar and cross states. In the broadcast state, the resonant wavelength from the input of the fiber is dropped just in fraction to the second fiber, while the remainder of the light continues to propagate in the first fiber. Thus, the amount of switched light energy does depend on the phase tuning mechanism. This since the amount of switched light energy does depend also on the phase relations in interference, which in turn depends of the following optical path distances: the distance between the first external mirror and the first deflector, the distance between the first deflector and the second deflector, and the distance between the second deflector and the second external mirror.

The following set of physical properties of the switch element should be considered as a set of critical design parameters of the device. In order to achieve a certain free spectral range of the device, i.e. leaving the spectral properties of the light unchanged except for the spectral region of interest in which the switching device is to operate, a certain maximum geometrical distance between the mirrors must be set. The radii of curvature of the mirrors can be used for compensation of an asymmetry of the optical field distribution inside the cavity, and can also be used for enhancing the coupling efficiency and overall performance of the switching device, e.g. by compensating for certain geometrical limitations of the cavity. The angle of out- and in-coupling of the optical modes in the fibers is to be chosen as close as possible to the perpendicular direction of the symmetry axis of the fiber, still leaving the cone of out- or in-coupled light free from the perpendicular direction. In case the perpendicular direction is contained within the cone of out- or in-coupled light, a spectral degeneracy of the coupling efficiency of the switch will occur, causing an unwanted enhancement of coupling efficiency in a region of the spectrum of operation of the switch. The tilt of the mirrors relative to each other (deviation from an all-parallel configuration of the cavity mirrors) control the spectral width of the coupling between the optical modes in the fibers. The more parallel the mirrors are to each other, the narrower and enhanced the spectral coupling efficiency will be, and, vice versa, the more tilt relative each other the mirrors possess, the wider and weaker the spectral coupling efficiency will be. The length of the blazed gratings of the optical fibers determines the effective length of interaction between the modes propagating in the optical fibers. The desired length of the blazed gratings is determined from the coupling strength of the gratings and the desired angular width of the out- or in-coupled light cone. For gratings possessing high coupling efficiencies, a short grating length should be chosen in order not to cause unwanted coupling back into the original fiber at the end of the grating. Similarly, for weak gratings, the grating length should be chosen long enough in order to ensure that the light coupled out from the first fiber is fully coupled into the second fiber. In addition, the length of the gratings determines the angular width of the cone of out- or in-coupled light of the fibers. The longer the grating length, the more narrow the cone of out- or in-coupled light, and vice versa.

The angular width of the out- or in-coupled light of the fibers, as determined by the grating length as previously described, determine how close to the perpendicular direction of the fiber one may choose out- and in-coupling light cone. The more narrow the cone is, the more close to perpendicular one may choose the direction of out-coupling, hence increasing the coupling efficiency between the interacting optical modes in the fibers. In order to achieve a high coupling efficiency between the propagating optical modes in the fibers, the reflectivities of the mirrors of the cavity should be chosen as high as possible. Imperfections of the mirror surfaces will cause scattering of the reflected optical waves inside the cavity, hence effectively causing a loss of power and a decrease in coupling efficiency. The strengths of the gratings are related to the length of the gratings.

Figure 2:
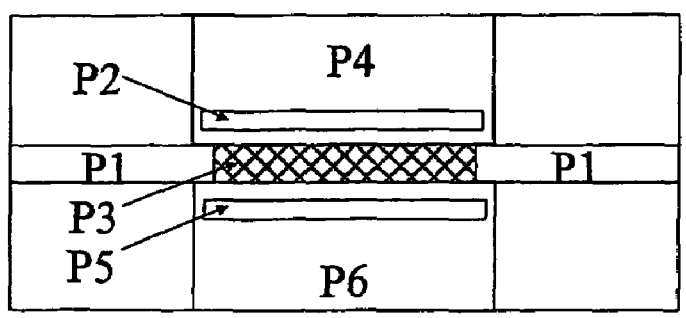
FIG. 2 schematically shows an embodiment of a cleaning device that may advantageously be used together with the switch element.

In FIG. 2 a cleaning element 20 is depicted. Such an element may be desirable to incorporate into switch devices to 'clean' a light wavelength channel from remaining signal content, down to a very low signal power level. Channel cleaning may be required in order to compensate for a non-ideal switching element. This since the switching element may not be able to completely switch all signal content in a light wavelength, when aiming to drop this light wavelength from the first to the second waveguide. The first waveguide should be cleaned from the unintentionally remaining signal content. This in order to allow re-use of the same wavelength for another data signal, while avoiding coherent mixing of the old and the new data signals sharing the same wavelength position. The cleaning element may be implemented in the same manner as the switch elements. Here, however, a second waveguide is not required to pick up out coupled light.

Yet another arrangement may be used to obtain a spectrally clean switching element. In this arrangement, two switch elements are used in a serial configuration as subsequently described. In the spectrally clean switching configuration, the first waveguide of the first basic switch element is connected to the first waveguide of the second basic switch element via a waveguide in which one may control the optical path length over which the light propagates from the first to the second basic switch element. The second waveguide of the first switching element is similarly connected to the second waveguide of the second switch element via a waveguide whose optical path length may, but not necessarily have to, be possible to control. The interconnecting waveguides, at least one of which possess the possibility of controlling the optical path length experienced by a propagating light wave, are together denoted as the enabling element of the spectrally clean switching element. As subsequently described, the role of the enabling element is to turn on or off the switching of a particular spectral region of the light, as determined by the configuration of the two basic switching elements. The two basic switch elements should, in the case of constituting the two switching components of a spectrally clean switching element, be designed in such a way that only fifty percent of the light in the first waveguide of each basic switch element is coupled over to the second waveguide of respective basic switch element.

The principle of operation of the spectrally clean switching element is as follows. As fifty percent of the power of the light in the first waveguide of the first basic switch element is coupled over to the second waveguide, passing through the waveguides of the enabling element, and being recombined with the remaining fifty percent of the light power in the second basic switch element, the relative phase of the light waves, when recombined in the second switching element, will determine whether constructive or destructive interference occur in the blazed gratings of the second basic switch element. When the relative phase shift of the light waves in the waveguides, when entering the second basic switch element from the enabling element, is a multiple of 2*pi, the second basic switching element will cause the remaining fifty percent of the light power in the first waveguide to be coupled over to the second waveguide, hence causing a switching from the first to the second channel of the spectrally clean switching element. In this case, the enabling element acts as an optical interconnect leaving the relative phase of the light waves invariant, and the spectrally selective switching is performed in the same manner as in the case of a basic switching element nominally designed for switching one hundred percent of the optical power in a certain spectral region. On the other hand, when the relative phase shift between the channels is pi plus a multiple of 2*pi, the second basic switching element will cause the fifty percent light power in the second waveguide to be coupled back into the first waveguide, hence in the first case, for a N*2*pi relative phase shift, a constructive interference is experienced in the second waveguide of the second basic switching element, while in the second case, for a (2*N+1)*pi relative phase shift, a constructive interference is instead experienced in the first waveguide. Using the enabling element as an on/off control (enabler) of the switch, the described principle of operation allows the basic switch elements to be reconfigured or adjusted in the off state, with a N*2*pi relative phase shift between the waveguides in the enabling element, without affecting the light waves in any of the neighboring wavelength channels. As the reconfiguration or adjustment of the basic switch elements is done, the spectrally clean switching element is put into operation by tuning the relative phase shift between the waveguides to (2*N+1)*pi. As the phase shift is tuned, the optical power coupled from the first to the second waveguide of the spectrally clean switching element will gradually increase from nominally zero to one hundred percent. The spectral region in which the switching is performed is confined to the interval as determined by the configurations of the two basic switching elements, and since these are kept constant during the tuning of the enabler, adjacent wavelength channels are left unaffected by the spectrally clean switching element.

Several mechanisms may be considered for achieving a relative phase shift between the light in the two waveguides of the enabling element. One way of causing the optical path length in one waveguide to change is to apply mechanical stress to the waveguide. Other means of changing the optical path length is to employ electro-optical effects, magneto-optical effects, or by other means, chemically, mechanically, or electro-magnetically, changing the refractive index of the core and/or cladding of the waveguides of the enabling element. The enabling element may also be incorporated in the first or second basic switch element by applying an electro-optical layer to any of the mirrors of the cavity, and applying a weakly reflecting mirror to the electro-optical layer, in a setup as for a dynamically reconfigurable Gires-Tournois interferometer.

In may be desired to incorporate polarization management, since the switch element and the cleaning element inherently is unable to properly handle light with arbitrary polarization state. Proposed devices includes Faraday mirror polarization handler, quarter-wave plate mirror polarization handler, dual path polarization handler and serial twist polarization handler.

Figure 3:
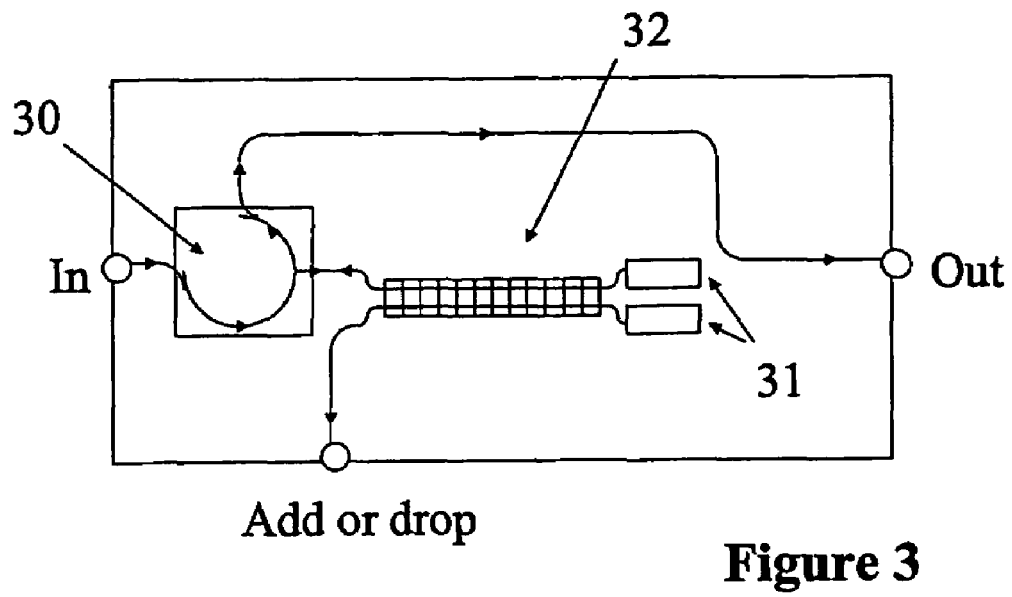
FIG. 3 schematically shows an embodiment of a add/drop device using an array of switch elements.

FIG. 3 shows an add-drop device where polarization management is obtained by having positioned between a circulator 30 and a pair of Faraday mirrors 31, an array of switching elements 32. Input light thus passes the circulator of the first waveguide. In the switch element, for the selected wavelength, i.e. the light wavelength which is resonant to the external resonator, when in cross state (i.e. when the phase tuning mechanism is used to achieve the cross state) one polarization component of this light wavelength is switched over to the second waveguide. Since the switch element is polarization selective, the remaining, perpendicular, polarization component is unaffected by this switch element, and passes through to the Faraday mirror of the first waveguide. Here, the light wavelength is back reflected. However, the polarization component has been rotated by 90 degrees by the Faraday mirror. Thus, when again reaching the same switch element, the back-reflected light now has the proper polarization state to be switched to the second waveguide. Due to the properties of the switching element, after having been coupled to the second waveguide, the different switched portions of the light wavelength will have the same polarization state but travel in opposite directions. Also, coherent mixing can be avoided within the switch element by proper design. When leaving the switch element, the polarization component, which was directly coupled from the first waveguide to the second waveguide, will be back reflected and rotated 90 degrees in the Faraday mirror of the second waveguide. This polarization component then passes the switch element without experience switching, since it has now been rotated to the insensitive polarization state, and following propagates to the circulator of the second waveguide. However, the polarization component, which was coupled from the first waveguide after Faraday mirror back reflection and rotation to the second waveguide, will be propagating directly to the circulator of the second waveguide. The two polarization components thus again combine in the second waveguide, as two orthogonal states of polarization. It is required that the optical paths between the switch element and the Faraday rotators of first and second waveguides are matched. This is in order to avoid polarization mode dispersion and also to avoid polarization dependent loss.

In the case of the Faraday mirror polarization handler, it is not required for polarization states to be maintained when light is propagating in waveguides between the switching element and the respective Faraday mirrors. This is due to reciprocity. It is sufficient that the polarization properties of the fiber, does not alter within the time it takes for light to propagate from the switching element to the respective Faraday mirror and back again. This condition is typically fulfilled, since the light propagation time is typically on the order of picoseconds, while the polarization changes are typically very much slower.

Figure 4:
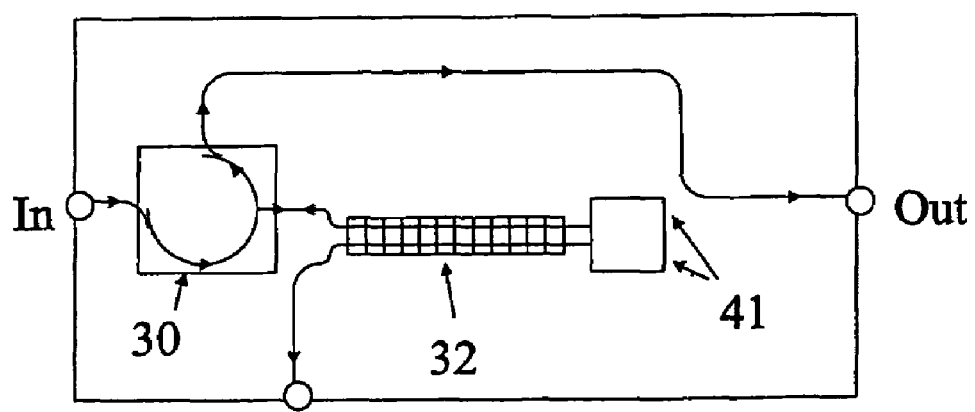
FIG. 4 schematically shows another embodiment of a add/drop device using an array of switch elements.

In FIG. 4 the Faraday mirror is replaced with a common quarter wave plate mirror 41. For a quarter-wave plate mirror polarization handler, the polarization state must be substantially maintained between the switching element(s) and the quarter-wave plate with mirror. Also, the polarization state for a switched wavelength must be substantially linear after having dropped one polarization component. Further, the remaining polarization component must be aligned at 45 degrees with respect to the optical axis of the quarter-wave plate. This in order for the quarter-wave plate and the mirror to return the remaining polarization rotated 90 degrees and thus switched by the element at the return path. The advantage with the quarter-wave plate mirror polarization handler is that a common quarter-wave plate and mirror could be more easily employed for both the first and second waveguide. This is not so easily implemented when using Faraday rotator elements in the Faraday mirror handler.

Figure 5:
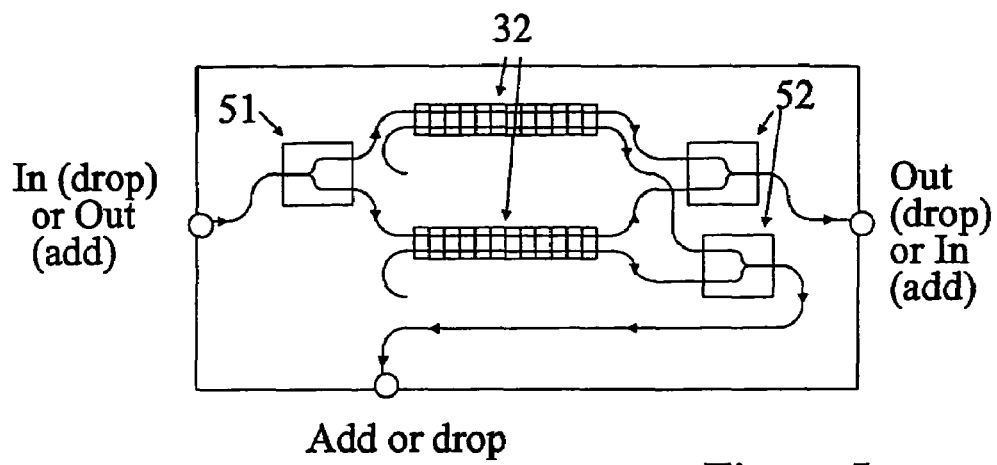
FIG. 5 schematically shows yet another embodiment of a add/drop device using an array of switch elements.

In FIG. 5 an add-drop device using dual path polarization handler is depicted. This is obtained by having the polarization of the input light propagating in the first waveguide split by a polarizing beam splitter 51 into two components, before the switching elements. Thus each polarization state is injected into a respective first waveguide, which is substantially polarization maintaining. Following, each polarization component is handled in its respective first waveguide. Each first waveguide contains one or more switching elements. After the switching elements, the respective first waveguides are again combined using another polarizing beam splitter 52 to a common first waveguide. Thus, for light wavelengths, which are not switched, the polarization components are again combined after having propagated through the switching elements. The arrangement of the second waveguide is a mirror image of the first waveguide. Thus, for light wavelengths which are switched, the polarization components are again combined after having propagated through the switching elements. The advantage of the dual path polarization handler is that it works in transmission, and thus does not require circulator components. A disadvantage with the dual path polarization handler is that it requires at least two switching elements for each wavelength, since each of the two polarization components requires a dedicated switching element. Also, the polarization has to be substantially maintained, considering all waveguides. Further, if employing a switch controller, both polarization components might need to be controlled independently.

Figure 6:
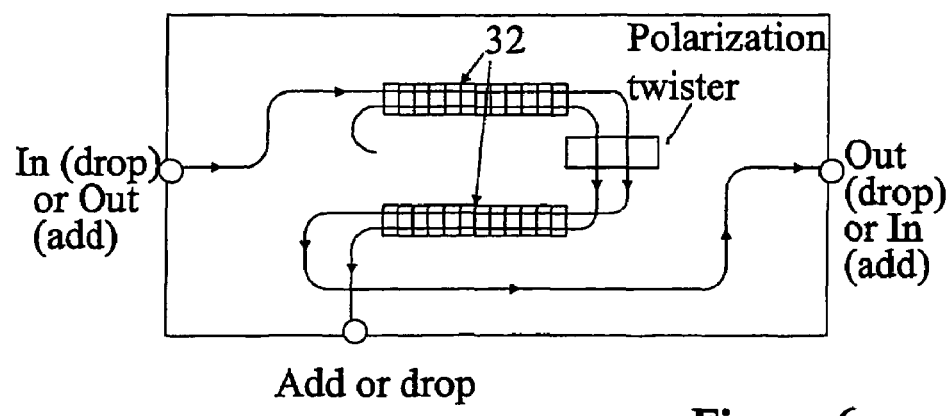
FIG. 6 schematically shows yet another embodiment of a add/drop device using an array of switch elements.

In FIG. 6, an add-drop device using serial twist polarization handling is shown. This is obtained by having the polarization of the input light propagating in the first waveguide, propagating to a first series of switch elements for different light wavelengths. The first array of switch elements then acts upon one of the polarization components. This in order to either switch or not switch a particular light wavelength. Then, the remaining polarization component, to be acted upon, is rotated (twisted) substantially 90 degrees, relative to a second array of switching elements. Following, the remaining polarization component is acted upon by a second array of switch elements. For the serial twist polarization handler, the rotation (twisting) of the remaining polarization component could be accomplished by twisting the main polarization axis of both the first and second waveguides. Here, the first and second waveguides are required to substantially maintain the polarization state of the propagating light wavelengths. The advantage of the serial twist polarization handler is that it works in transmission, and thus does not require circulator components. A disadvantage with the serial twist polarization handler is that it requires at least two switching elements for each wavelength, since each of the two polarization components requires a dedicated switching element. Also, the polarization has to be substantially maintained, considering all waveguides. Further, if employing a switch controller, both polarization components might need to be controlled independently.

Figure 7:
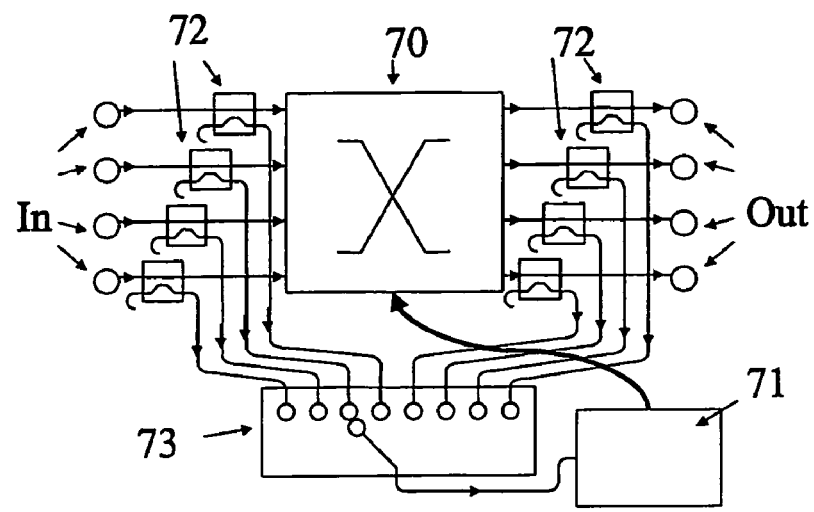
FIG. 7 schematically shows an switch device incorporating a switch controller.

FIG. 7 shows an integrated switch device 70, incorporating the inventive optical switch. The switch device 70 includes a switch controller 71 that monitors the light output of the switch elements and uses this information as a feedback for adjustment. Light is coupled from the input optical fibers via tap devices 72. Which input fiber to be measured is then chosen by the mechanical switch 73. In general, a switch controller measures the output light wavelengths and possibly also the input light wavelengths for the first and second waveguides of the switch element(s). The switch controller uses this information to control the states of the actuation elements, such that the desired signal power is obtained for the respective output light wavelengths.

In order to fully handle a given switch application, the corresponding implementation of a full-featured integrated switch device, is desirable. Such an integrated switch device may consist of an assembly of switch elements, polarization handlers, cleaning elements and switch controllers.

In FIGS. 8-12 a number of types of basic device implementations for the switch mechanism are shown. Such a device is referred to as an integrated switch device. An integrated switch device may consist of an assembly of underlying elements, such as switch elements, polarization handlers, cleaning elements and also switch controllers.

Figure 8:
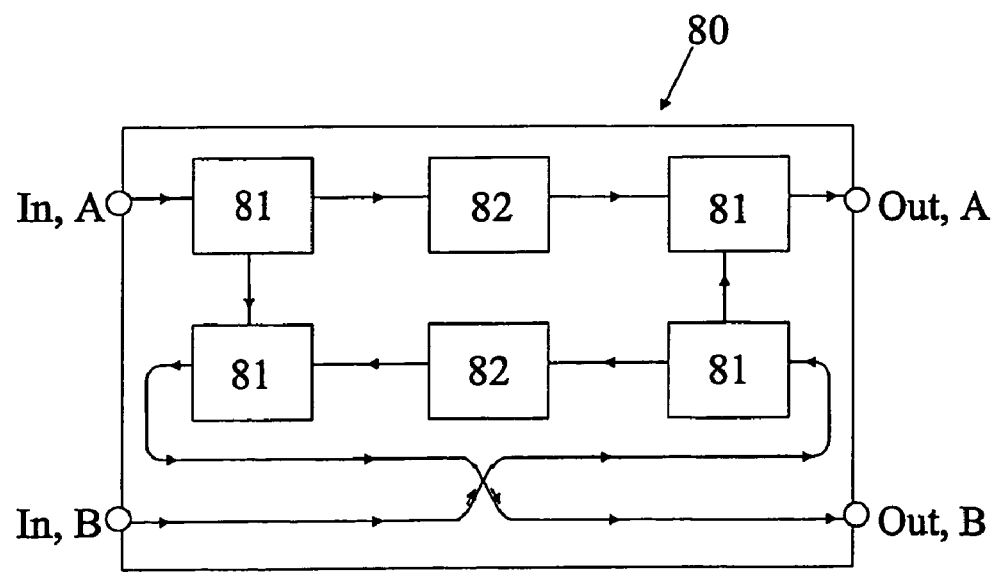

In FIG. 8 a wavelength-selective 2×2 fiber switch 80 is depicted. It is built by underlying devices, of the types add-drop device 81 and cleaning device 82. This integrated switch device is denoted the two-fiber switch device.

Note that when the two-fiber switch device employs the dual path polarization handler, the number of polarizing beam splitters can be reduced. This is by splitting the polarization components at the input ports of the two-fiber switch device, and keeping them separated until the output ports, where polarizing beam splitters are used to again combine the polarization components. Here, in order to avoid polarization mode dispersion, the optical paths have to be carefully matched for the respective polarization components.

Note that when the two-fiber switch device employs the serial twist polarization handler, the number of polarization twisters can be reduced. This is by first handling dropping, cleaning and adding of one of the polarization components, then employ a polarization twister, and then second dropping, cleaning and adding the remaining polarization component. Here, in order to avoid polarization mode dispersion, the optical paths have to be carefully matched for the respective polarization components.

Figure 9:
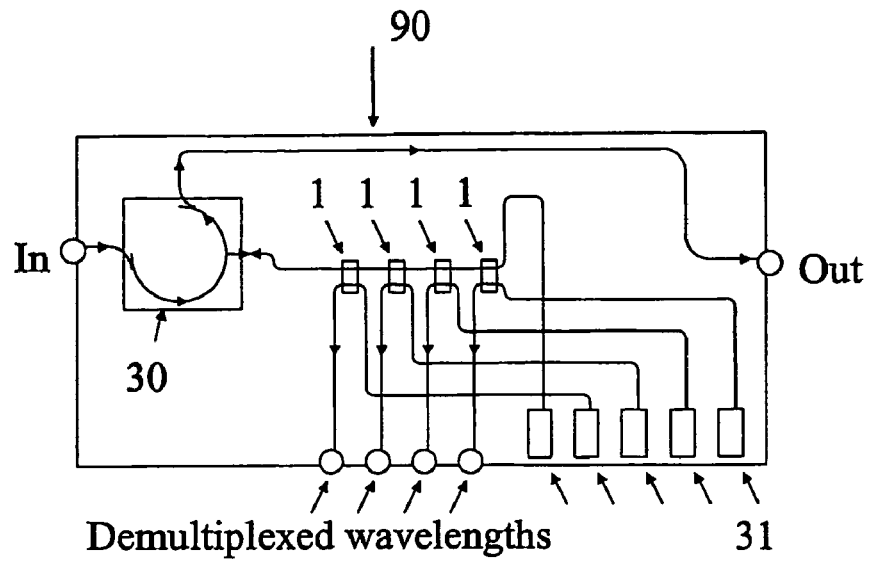

In FIG. 9 a multiplex device 90 is depicted. This device multiplexes/de-multiplexes one ingress fiber from/to several egress fibers.

Figure 10:
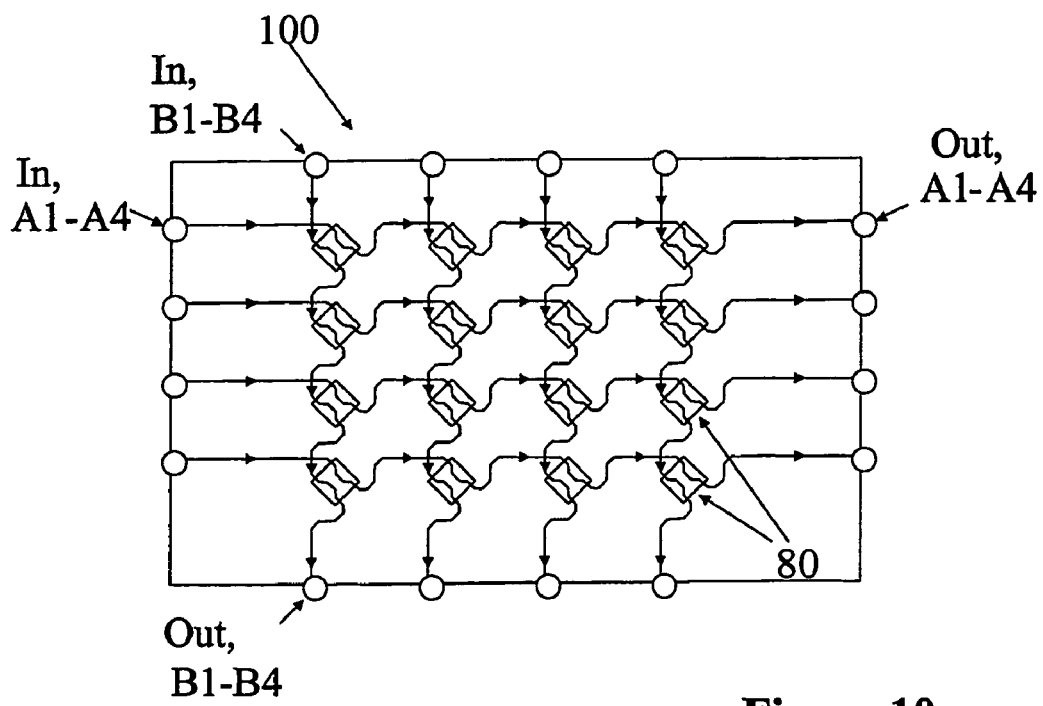

In FIG. 10 a matrix device 100 is depicted. The device type uses N input fibers to N output fibers, where the input fibers are crossed with respect to the output fibers. The N input fibers are linked to the N output fibers in N*N nodes. The linking occurs via switch elements. This switch device is referred to as a matrix switch device. For the matrix switch device, a configuration could be chosen where light wavelengths are exchanged between the fibers via two-fiber switch devices. Note that when the matrix switch device employs the dual path polarization handler, the number of polarizing beam splitters can be reduced. This is by splitting the polarization components at the input ports of the matrix switch device, and keeping them separated until the output ports, where polarizing beam splitters are used to again combine the polarization components. Here, in order to avoid polarization mode dispersion, the optical paths have to be carefully matched for the respective polarization components. Note that when the matrix switch device employs the serial twist polarization handler, the number of polarization twisters can be reduced. This is by first handling dropping, cleaning and adding of one of the polarization components, then employ a polarization twister, and then second dropping, cleaning and adding the remaining polarization component. Here, in order to avoid polarization mode dispersion, the optical paths have to be carefully matched for the respective polarization components. For the matrix switch device, alternatively, another configuration could be chosen where the input and output fibers are perpendicularly oriented relative to each other in the basic switch elements. Half-wave plates could then be inserted in the switching elements, between the input fibers and output fibers. This since the switched polarization component needs to be rotated 90 degrees to be oriented perpendicular to the propagation direction of the output fiber.

Figure 11:
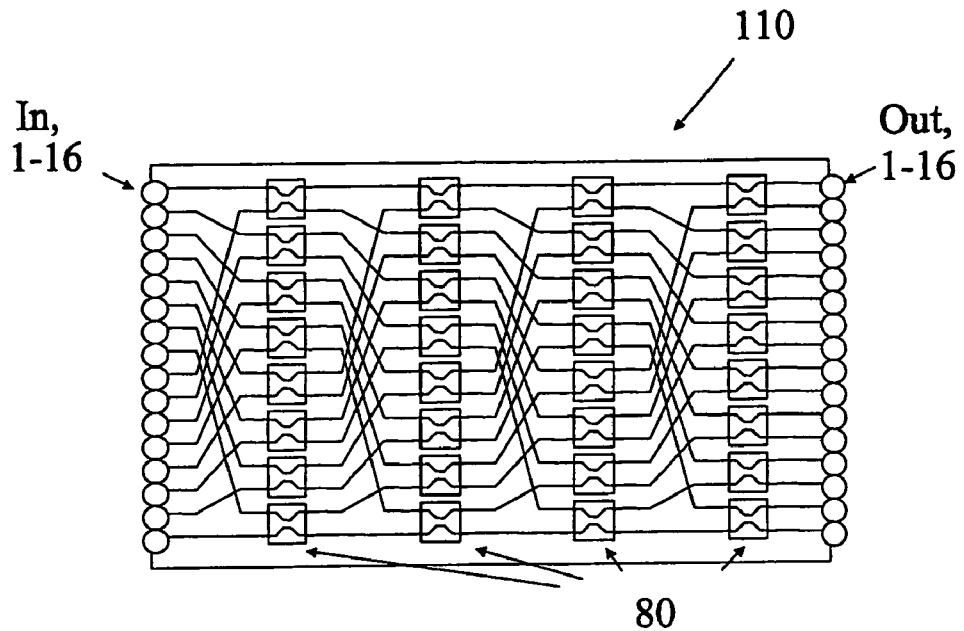

FIG. 11 depicts a switch device, which uses multiple cascaded stages of two-fiber switch devices. This sixth switch device will be referred to as a the multi-stage switch device.

Figure 12:
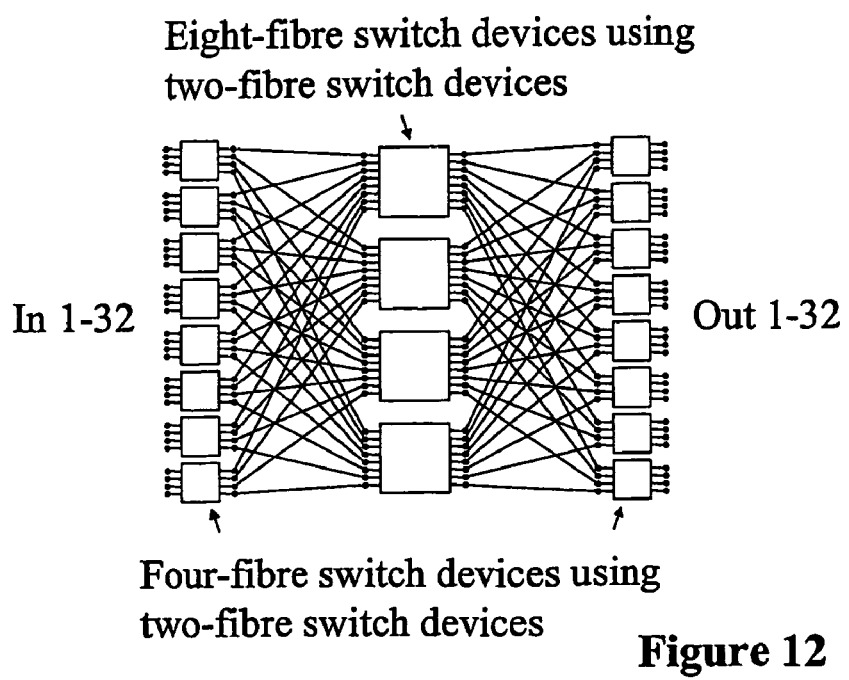

FIG. 12 depicts a close network type switch device using two-fiber switch devices.

The embodiments of the present invention that are described above and schematically shown in the drawings are not intended to limit the scope of the protection sought. On the contrary, any person skilled in the art will realize that a number of different embodiments, and modification of the embodiments shown and described, are conceivable within the scope of the invention. The scope of the invention is defined in the appended claims.

The invention claimed is:

1. A spectrally selective optical switch, comprising
a first and a second optical waveguide each having a light guiding structure arranged to guide light along a predetermined path, the optical waveguides being arranged adjacent and parallel to each other;
an external resonator defined by a first and a second mirror, said first and said second mirror being provided on opposite sides and outside of said first and second light guiding structures, and said external resonator being resonant to a specific wavelength; and
a deflector provided in each of said first and second optical waveguide, the deflectors being arranged to deflect light propagating in one of the light guiding structures to the other light guiding structure by operation of said external resonator,
wherein the deflector in at least one of said first and second optical waveguides comprises:
a first blazed Bragg grating arranged in said at least one of said first and second optical waveguides, and
a second blazed Bragg grating arranged in said at least one of said first and second optical waveguides,
wherein said first blazed Bragg grating and said second blazed Bragg grating are superimposed upon each other, and oriented at different angels to deflect light out from said at least one of said first and second optical waveguides into two anti-parallel beams.

2. The optical switch according to claim 1, wherein either one of the first and the second mirror is a dielectric multi-layer mirror.

3. The optical switch according to claim 1, wherein the wavelength to which the external resonator is resonant is adjustable, the spectrally selective optical switch thereby being tunable.

4. The optical switch according to claim 1, wherein the optical waveguide is an optical fiber and the light guiding structure is a core in said optical fiber.

5. The optical switch according to claim 1, wherein the first and second waveguides are implemented in the form of a dual-core fiber.

6. A matrix switch device, which uses N input fibers to N output fibers, where the input fibers are crossed with respect to the output fibers and where the N input fibers are linked to the N output fibers in N*N nodes, wherein said linking is at least partly accomplished with an optical switch according to claim 1.

7. An arrangement comprising two optical switches as defined in claim 1, wherein the first optical waveguides of the switches are connected to each other by means of a first interconnecting waveguide and the second optical waveguides of the switches are connected to each other by means of a second interconnecting waveguide, and wherein each of said switches is arranged to couple 50 percent of available light power from the first optical waveguide to the second optical waveguide, the arrangement further comprising means for altering the optical path length of at least one of the first and the second interconnecting waveguides such that constructive or destructive interference can be obtained in the second optical waveguide of the second switch by altering said optical path length.

8. The optical switch according to claim 1, wherein said first blazed Bragg grating and said second blazed Bragg grating are oriented at a right angle with respect to each other.

* * * * *